UNITED STATES PATENT OFFICE.

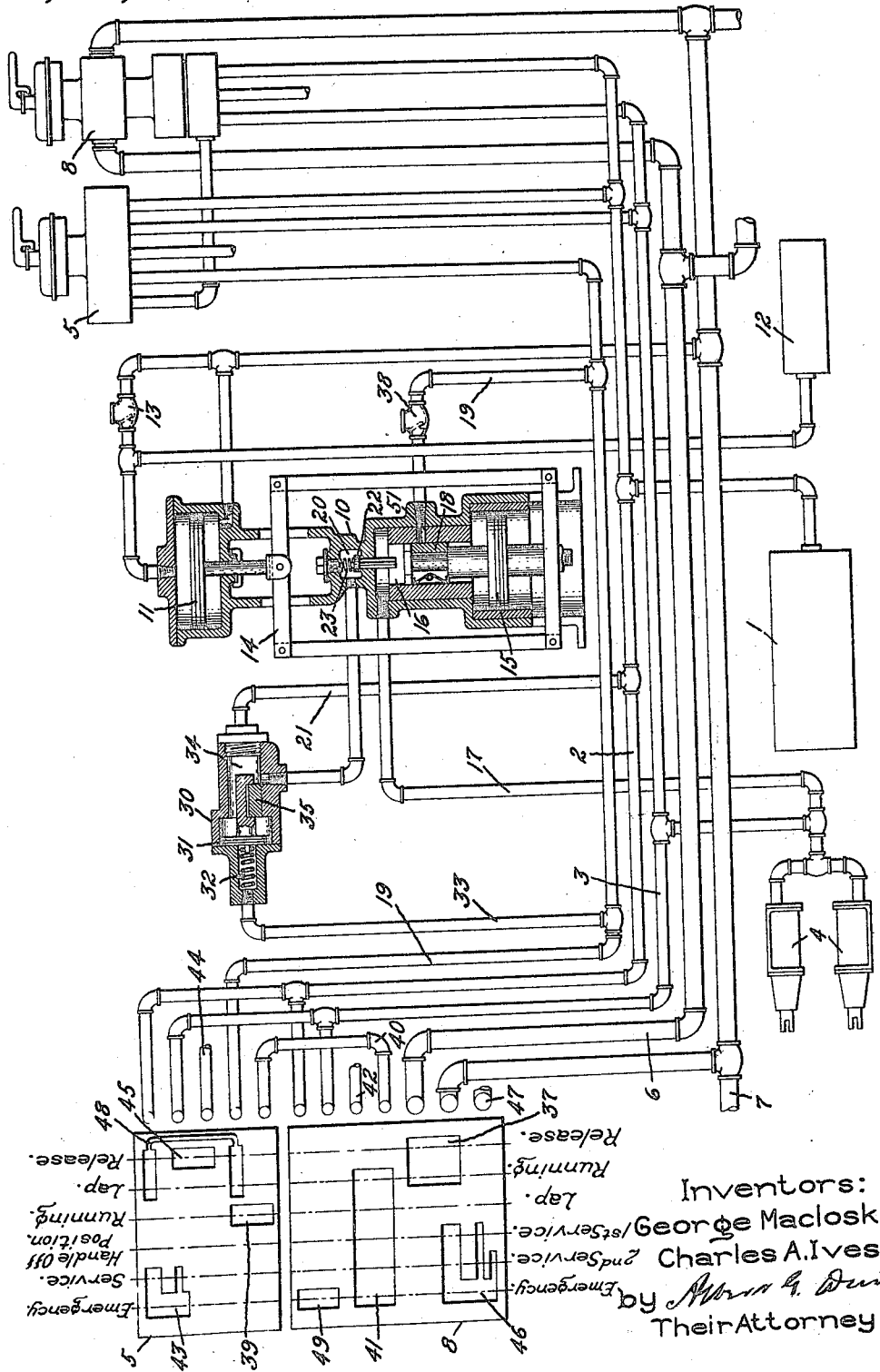

GEORGE MACLOSKIE AND CHARLES A. IVES, OF ERIE, PENNSYLVANIA, ASSIGNORS TO GENERAL ELECTRIC COMPANY, A CORPORATION OF NEW YORK.

COMBINED AIR AND VACUUM BRAKE SYSTEM.

1,412,662.    Specification of Letters Patent.    Patented Apr. 11, 1922.

Application filed July 7, 1921. Serial No. 483,093.

*To all whom it may concern:*

Be it known that we, GEORGE MACLOSKIE and CHARLES A. IVES, citizens of the United States, residing at Erie, county of Erie, State of Pennsylvania, have invented certain new and useful Improvements in Combined Air and Vacuum Brake Systems, of which the following is a specification.

Our invention relates to combined air and vacuum brake systems.

One object of our invention is to provide a new and improved brake system of the above character whereby the vacuum and the compressed air brakes may be applied and released simultaneously or in any desired sequence.

A further object of our invention is to provide an improved and more sensitive combined air and vacuum brake valve for equalizing the braking power of the air and vacuum brakes when both are simultaneously applied than any similar brake valve which has been used heretofore.

Our invention will be better understood from the following description taken in connection with the accompanying drawing, and its scope will be pointed out in the appended claims.

The accompanying drawing is a diagrammatic view partly in section of a combined air and vacuum brake system for a locomotive with our invention embodied therein.

As shown in the drawing, the air portion of the brake system comprises a main reservoir 1 connected to a main reservoir pipe 2, a straight air pipe 3 connected to the brake cylinder 4 and a straight air motorman's brake valve 5 at each end of the locomotive for controlling the air brakes on the locomotive, which it is assumed is provided with air brakes only. The vacuum portion of the brake system shown comprises a vacuum pipe 6, connected to a suitable vacuum pump or exhauster, (not shown) a vacuum brake pipe 7 which extends to the vacuum brake apparatus on the train and a vacuum brake valve 8 for controlling the vacuum brakes. Since the apparatus and operating principles of vacuum brakes are well known in the art, a complete disclosure of the vacuum brake apparatus is deemed unnecessary.

In order to equalize the braking power of the brakes on the locomotive and the train when both are simultaneously applied, we provide the combined air and vacuum brake valve 10. As shown in the drawing this valve comprises a casing containing a piston 11. The chamber above the piston as viewed in the drawing is connected to a vacuum reservoir 12 and to the vacuum brake pipe 7 by means of a one-way check valve 13, which only allows fluid to flow from the chamber above the piston 11 to the vacuum brake pipe 7. The chamber below the piston 11 is connected directly to the vacuum brake pipe 7. The areas of both faces of the piston 11 are substantially equal so that when the pressure is the same on both sides of the piston it is in a balanced condition. When, however, the vacuum in the vacuum brake pipe 7 is destroyed it is evident that the pressure in the chamber below the piston 11 is greater than the pressure above the piston and therefore the piston will move upwardly.

Piston 11 is connected by the linkage 14 to a piston 15, one side of which is subject to atmospheric pressure and the other side of which is subject to the pressure in a valve chamber 16 which in turn is connected to the locomotive brake cylinders 4 by a pipe 17. The valve chamber 16 contains a slide valve 18 which is connected to the piston 15 and controls the communication between the valve chamber 16 and the exhaust pipe 19.

The combined air and vacuum brake valve 10 is also provided with a valve chamber 20 which is connected by means of a pipe 21 to the main reservoir pipe 2. The valve chamber 20 contains a valve 22 which is arranged to be actuated by the upward movement of the pistons 11 and 15. The valve 22 is arranged to establish communication between valve chambers 16 and 20 to supply compressed air to the brake cylinder 4 through the pipe 17. The valve 22 is normally held in its closed position by a spring 23. It will be evident that the pressure exerted against the top of piston 15 is the brake cylinder pressure and is in the opposite direction to the pressure exerted against the lower side of the piston 11, which is the pressure in the vacuum brake pipe 7. By properly designing the areas of the pistons 11 and 15 so that a certain predetermined number of pounds pressure in the valve chamber 16 is necessary to balance the upward force exerted against the piston 11 by a predetermined number of pounds pressure in the vacuum brake pipe 7, it will be evident that the braking power exerted on the locomotive and the cars of the train can be made equal.

It is often desirable on a long down grade where it is necessary to keep the brakes on for a long period of time to release and apply the locomotive brakes and the train brakes alternately so as to allow the brake shoes to cool off. We accomplish this result by interconnecting the motorman's brake vlaves 5 and 8 so that the exhaust pipe 19 is only connected to atmosphere when both valves are in certain positions and by providing the cut off valve 30 which is arranged to be operated to cut off communication through the main reservoir pipe 21 only when the straight air brake valve 5 is in certain positions. As shown in the drawing, the cut off valve 30 comprises a casing containing a piston 31, one side of which is subject to the pressure of a spring 32 and the pressure in the pipe 33 which is connected to the exhaust pipe 19 and the other side of which is subject to the pressure in the valve chamber 34 which is connected to the main reservoir pipe 21. The valve chamber 34 contains a slide valve 35 which is connected to the piston 31 and which is arranged to cut off communication between the pipe 21 and the valve chamber 20 of the combined air and vacuum brake valve 10 when the fluid pressure on both sides of the piston 31 is substantially equal.

The connections which are established by each brake valve when in its different positions will be obvious from the development of these brake valves which is shown in the drawing, and therefore a further description thereof is deemed unnecessary.

In operation when all the brakes are released and the straight air brake valve 5 and the vacuum brake valve 8 at the operating end of the locomotive are both in the running position each side of the piston 11 is connected to the vacuum pipe 6 through the vacuum brake pipe 7 and the passage 37 of the vacuum brake valve 8. The opposite sides of the piston 11 therefore are subject to the partial vacuum which is maintained in the vacuum pipe 6. Furthermore, since the pressure in the brake cylinders 4 is exhausted the pressure on both sides of the piston 15 is the same, and therefore the pistons 11 and 15 will be in their lowest position, in which position the port 51 is uncovered and communication is established between the brake cylinders 4 and atmosphere through the pipe 17, valve chamber 16, port 51, one-way check valve 38, pipe 19, passage 39 of the brake valve 5, pipe 40, passage 41 of the vacuum brake valve 8 and the exhaust pipe 42. Since the pipe 19 is connected to atmosphere the cut off valve 31 occupies the position shown in the drawing and therefore main reservoir pressure is supplied from the main reservoir pipe 2 through the pipe 21 and the valve chamber 34 to the valve chamber 20 in the combined air and vacuum brake valve 10.

If it is desired to effect an application of the air brakes only the straight air brake valve 5 at the operating end is moved to the service position, in which position the main reservoir pipe 2 is connected by means of a restricted portion of the passage 43 in the brake valve 5 to the straight air pipe 3 which is connected to the brake cylinders 4. Fluid under pressure is also supplied from the straight air pipe 3 through the pipe 17, valve chamber 16 and check valve 38 to the exhaust pipe 19, which at this time is blanked at the operating end of the locomotive and also at the nonoperating end of the locomotive where the straight air brake valve 5 is in the handle-off position and the vacuum brake valve 8 is in the lap position. The locomotive brakes may be released by moving the straight air brake valve 5 at the operating end to the release position, in which position the straight air pipe 3 is connected to the exhaust pipe 44 by the passage 45 in the straight air brake valve, or to the running position, in which position the exhaust pipe 19 is connected to atmosphere.

If it is desired to effect a service application of the brakes on both the locomotive and the train the straight air brake valve 5 at the operating end is left in the running position and the vacuum brake valve 8 is moved to the desired service position, in which position the vacuum brake pipe 7 is connected by a passage 46 in the vacuum brake valve to the pipe 47 which is connected to atmosphere. The pressure in the brake pipe 7 is thus increased and the vacuum brakes on the train are applied in accordance with the well known operating principles of vacuum brakes. Fluid at atmospheric pressure is also supplied from the vacuum brake pipe 7 to the chamber below the piston 11 of the combined air and vacuum brake valve 10. The check valve 13 prevents fluid at atmospheric pressure from being supplied to the chamber above the piston 11. Since there is still a partial vacuum above the piston 11, the piston is operated by the atmospheric pressure supplied to the chamber below it so that the slide valve 18 cuts off communication between the valve chamber 16 and the exhaust pipe 19 through the port 51 and then upon further upward movement opens the valve 22 to establish communication between the valve chamber 20 which is connected to the main reservoir pipe 2 and the pipe 17 which is connected to the brake cylinders 4. Fluid under pressure is thus supplied to the valve chamber 16 and to the brake cylinders 4.

When the brake cylinder pressure, which acts on the differential piston 15, increases to a value sufficient to overcome the atmospheric pressure acting against the piston 11, the pistons move to the position shown in the drawing thereby permitting the valve 22 to close. In this manner, it is evident that we are able to obtain an equal braking power on the locomotive and on the cars of the train. By having both sides of the piston 15 normally connected to atmosphere a very sensitive device is obtained as it will be evident that any slight change in pressure in the vacuum brake pipe 7 causes the combined air and vacuum brake valve to operate and effect a corresponding change in the brake cylinder pressure.

The brakes on the locomotive and train may be released simultaneously by moving the vacuum brake valve 8 to the running position, the straight air brake valve 5 still being in the running position. When the vacuum brake valve is in the running position the vacuum brake pipe 7 is connected to the vacuum pipe 6 by the passage 37 in the vacuum brake valve so that the vacuum brakes on the train are released by the reduction in pressure thus produced in the vacuum brake pipe 7. This reduction in pressure decreases the force exerted against the lower side of the piston 11 so that the brake cylinder pressure in the valve chamber 16 causes the pistons to move downwardly from the position shown in the drawing so that the slide valve 18 uncovers port 51 and establishes communication between the pipe 17, which is connected to the brake cylinders 4, and atmosphere through the check valve 38, pipe 19, passage 39 in the straight air brake valve 5, pipe 40, passage 41 in the vacuum brake valve 8 and the exhaust pipe 42.

In case however it is desired to release the vacuum brakes only, the vacuum brake valve 8 is moved to its release position instead of its running position while the brake valve 5 is in its running position. The vacuum brakes on the train are then released in the manner above described but the locomotive brakes are not released because the pipe 40 is blanked in the release position of the vacuum brake valve 8. If it is desired to release the locomotive brakes after the vacuum brakes have been released this may be done by either moving the vacuum brake valve to its running position or by moving the straight air brake valve to its release position so that the brake cylinders 4 are connected to atmosphere.

If it is desired to apply the train brakes again after they have been released and the locomotive brakes are still applied, this may be done by moving the vacuum brake valve to the desired service position. The combined air and vacuum brake valve 10 then operates in the manner above described to equalize the braking power on the locomotive and the cars of the train.

If it is desired to release the locomotive brakes only after the locomotive and train brakes have been applied, this may be done by moving the straight air brake valve 5 to the release position while the vacuum brake valve is in its lap position. When the straight air brake valve is in its release position the brake cylinders 4 are connected to atmosphere in the manner above described. This reduction in brake cylinder pressure reduces the pressure in the valve chamber 16 of the combined air and vacuum brake valve 10 so that the pressure in the chamber below the piston 11 causes the pistons 11 and 15 to move upwardly from the position shown in the drawing and open the valve 22. In order to prevent fluid from being supplied from the main reservoir pipe 2 through the pipe 21 to the straight air pipe 3 which is connected to atmosphere at this time we provide the cut off valve 30 in the pipe 21. When the straight air brake valve is in its release position main reservoir pipe 2 is connected by the passage 48 to the pipe 19 which in turn is connected to pipe 33. Consequently, main reservoir pressure is supplied to both sides of the piston 31 of the cut off valve 30 so that the spring 32 causes the slide valve 35 to cut off communication between the pipe 21 and the valve chamber 20. Therefore, no fluid under pressure is vented from the main reservoir pipe 2 by the opening of the valve 22 at this time.

If it is desired to release the train brakes after the locomotive brakes have been released this may be done by moving the vacuum brake valve 8 to its running position.

If it is desired to apply the locomotive brakes again after they have been released and while the vacuum brakes are still applied this may be done by moving the straight air brake valve to its running position and leaving the vacuum brake valve in its lap position. Fluid is then vented from the pipes 19 and 33 so that the cut off valve 30 is operated to open communication between the pipe 21 and the valve chamber 20 so that fluid under pressure is supplied from this valve chamber through the valve 22 and the pipe 17 to the brake cylinders 4. The combined air and vacuum brake valve 10 then operates in the manner above described to equalize the braking power on the locomotive and the cars of the train.

If it is desired to apply the vacuum brakes on the train only the straight air brake valve 5 is moved to its lap position so that the cut off valve 30 cuts off the communication between the pipe 21 and the valve chamber 20 and then the vacuum brake valve 8 is moved to its desired service position.

The check valve 38 is provided in the pipe 19 so that the fluid will not be supplied to the brake cylinders 4 through the pipe 19, valve chamber 16 and pipe 17 by the motorman turning the straight air brake valve 5 either to its lap or release position while the vacuum brake valve is left in its running or release position.

If it is desired to make an emergency application of the brakes on the locomotive only the straight air brake valve is moved to its emergency position, in which position the main reservoir pipe 2 is connected to the straight air pipe 3 by a large portion of the passage 43 of the straight air brake valve 5. If, however, it is desired to make an emergency application on the locomotive and train the vacuum brake valve is moved to its emergency position, in which position the main reservoir pipe 2 is connected directly to the straight air pipe by a large passage 49 in the vacuum brake valve and the vacuum brake pipe 7 is connected to the pipe 47 by the large portion of the passage 46 of the vacuum brake valve.

While we have shown and described one embodiment of our invention, we do not desire to be limited to the specific arrangement, but seek to cover in the appended claims all those modifications which fall within the true spirit and scope of our invention.

What we claim as new and desire to secure by Letters Patent of the United States, is,—

1. In a combined air and vacuum brake system the combination of a vacuum brake pipe, a vacuum reservoir, a brake cylinder, a source of compressed air, a valve for controlling communication between said source and brake cylinder, and two differentially connected pistons for controlling said valve, one of said pistons being subject to the opposing pressures of said vacuum brake pipe and said vacuum reservoir, and the other one of said pistons being subject to the opposing pressures of said brake cylinder and atmosphere.

2. In a combined air and vacuum brake system, the combination of a vacuum brake pipe, a vacuum reservoir, a brake cylinder, a source of compressed air, a valve for controlling communication between said source and brake cylinder and two differentially connected pistons for controlling said valve, one of said pistons being subject to the opposing pressures of said vacuum brake pipe and said vacuum reservoir, and the other one of said pistons being subject to the opposing pressures of said brake cylinder and atmosphere, said pistons being connected so that the vacuum brake pipe pressure and the brake cylinder pressure tend to move said pistons in opposite directions.

3. In a combined air and vacuum brake system the combination of a vacuum brake pipe, a vacuum reservoir, a brake cylinder, a source of compressed air, a valve for controlling communication between said source and brake cylinder, a valve for controlling communication between said brake cylinder and atmosphere, and two differentially connected pistons for controlling said valves, one of said pistons being subject to the opposing pressures of said vacuum brake pipe and said vacuum reservoir and the other one of said pistons being subject to the opposing pressures of said brake cylinder and atmosphere, said pistons being connected so that the vacuum brake pipe pressure and the brake cylinder pressure tend to move said pistons in opposite directions.

4. In a combined air and vacuum brake system, the combination of a vacuum brake pipe, a vacuum reservoir, a brake cylinder, a source of compressed air, a valve for controlling communication between said source and brake cylinder, two differentially connected pistons for operating said valve, one of said pistons being subject to the opposing pressures of said vacuum brake pipe and said vacuum reservoir and the other one of said pistons being subject to the opposing pressures of said brake cylinder and atmosphere, a pipe for establishing communication between said vacuum reservoir and said vacuum brake pipe, and a one-way check valve in said pipe arranged to prevent the flow of fluid under pressure from said vacuum brake pipe to said vacuum reservoir.

5. In a combined air and vacuum brake system the combination with a vacuum brake pipe, an air brake cylinder, a source of air pressure, a vacuum brake valve for controlling the pressure in said vacuum brake pipe to control the vacuum brakes of the system, and a valve device operated by variations in pressure in the vacuum brake pipe for establishing communication between said source of air pressure and brake cylinder, of an air brake valve for controlling the air brakes of the system independently of the vacuum brakes, and for controlling independently of said valve device the communication through which an under pressure is supplied from said source of air pressure to said brake cylinder by said valve device.

6. In a combined air and vacuum brake system the combination with a vacuum brake pipe, an air brake cylinder, a source of air pressure, a vacuum brake valve for controlling the pressure in said vacuum brake pipe to control the vacuum brakes of the system, and a valve device operated by variations in pressure in the vacuum brake pipe for establishing communication between said source of air pressure and brake cylinder, of an air brake valve for controlling the air brakes of the systems independently of the vacuum brakes and arranged in certain of its positions to effect independently of said valve device the cutting off of the communication through which air under pressure is supplied from said source of pressure to said brake cylinder by said valve device.

7. In a combined air and vacuum brake system, the combination with a vacuum brake pipe, an air brake cylinder, a source of air pressure, a vacuum brake valve for controlling the pressure in said vacuum brake pipe to control the vacuum brakes of the system, and a valve device operated by variations in pressure in the vacuum brake pipe for controlling the communication between said source of air pressure and brake cylinder, of an air brake valve for controlling the air brakes of the systems independently of the vacuum brakes, and a cut off valve arranged to be controlled by said air brake valve to cut off the communication through which air under pressure is supplied from said source of pressure to said brake cylinder by said valve device.

8. In a combined air and vacuum brake system, the combination with a vacuum reservoir, a vacuum brake pipe, an air brake cylinder, a source of air pressure, a valve for controlling communication between said source and brake cylinder, a second valve for controlling communication between said brake cylinder and atmosphere to exhaust the pressure in said brake cylinder, and two differentially connected pistons for operating said valves, one of said pistons being subject to the opposing pressures of said vacuum brake pipe and said vacuum reservoir and the other one of said pistons being subject to the opposing pressures of said brake cylinder and atmosphere, of a vacuum brake valve for varying the pressure in said vacuum brake pipe to control the vacuum brakes of the system and for controlling the communication through which said second valve exhausts the pressure in said brake cylinder.

9. In a combined air and vacuum brake system, the combination with a vacuum reservoir, a vacuum brake pipe, an air brake cylinder, a source of air pressure, a valve for controlling communication between said source, and brake cylinder, a second valve for controlling communication between said brake cylinder and atmosphere to exhaust the pressure in said brake cylinder, and two differentially connected pistons for operating said valves, one of said pistons being subject to the opposing pressures of said vacuum brake pipe and said vacuum reservoir and the other one of said pistons being subject to the opposing pressures of said brake cylinder and atmosphere, of a vacuum brake valve having a position in which the communication through which said second valve exhausts the pressure in said brake cylinder is cut off, said communication being open in the other positions of the brake valve.

10. In a combined air and vacuum brake system, the combination with a vacuum reservoir, a vacuum brake pipe, an air brake cylinder, a source of air pressure, a valve for controlling communication between said source and brake cylinder, a second valve for controlling communication between said brake cylinder and atmosphere to exhaust the pressure in said brake cylinder, and two differentially connected pistons for operating said valves, one of said pistons being subject to the opposing pressures of said vacuum brake pipe and said vacuum reservoir and the other one of said pistons being subject to the opposing pressures of said brake cylinder and atmosphere, of a vacuum brake valve having a position for effecting the release of the vacuum brakes of the system and in which the communication through which said second valve exhausts the pressure in said brake cylinder is cut off.

In witness whereof, we have hereunto set our hands this 28th day of June, 1921.

GEORGE MACLOSKIE.
CHARLES A. IVES.